June 2, 1953  G. SCHROENGHAMER  2,640,578
ARTICLE TRANSFER FOR CONVEYER ORGANIZATION
Filed April 7, 1949  2 Sheets-Sheet 2
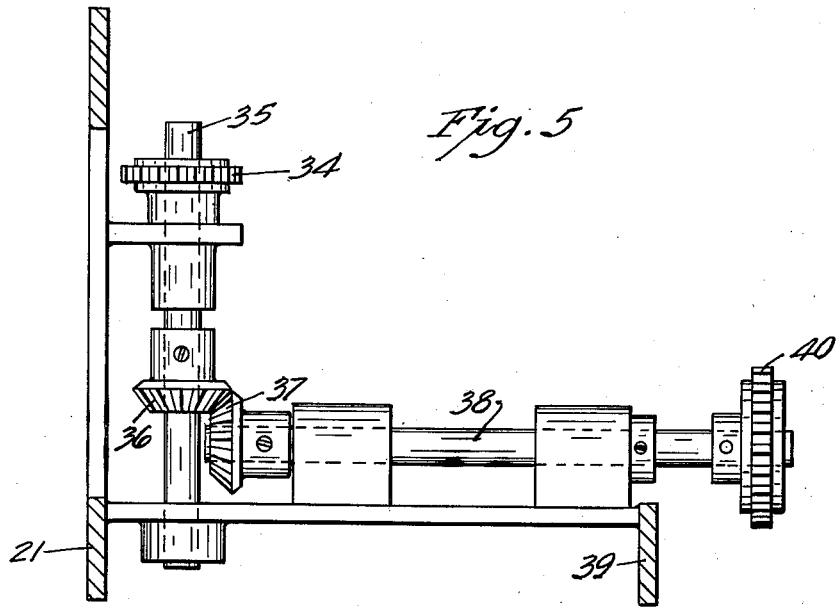
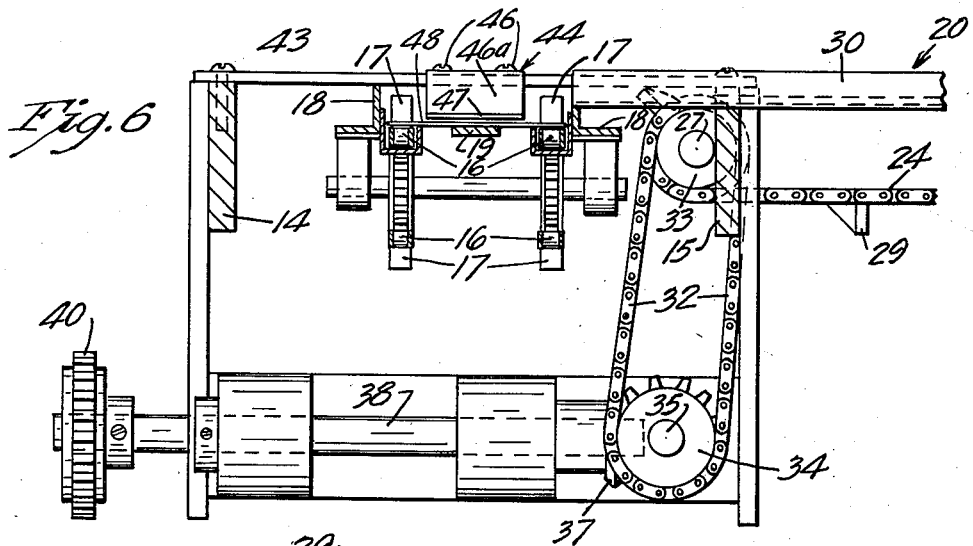
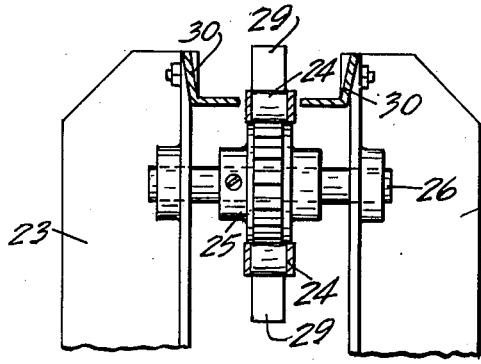
Inventor
George Schoenghamer
By Williamson & Williamson
Attorneys Patented June 2, 1953

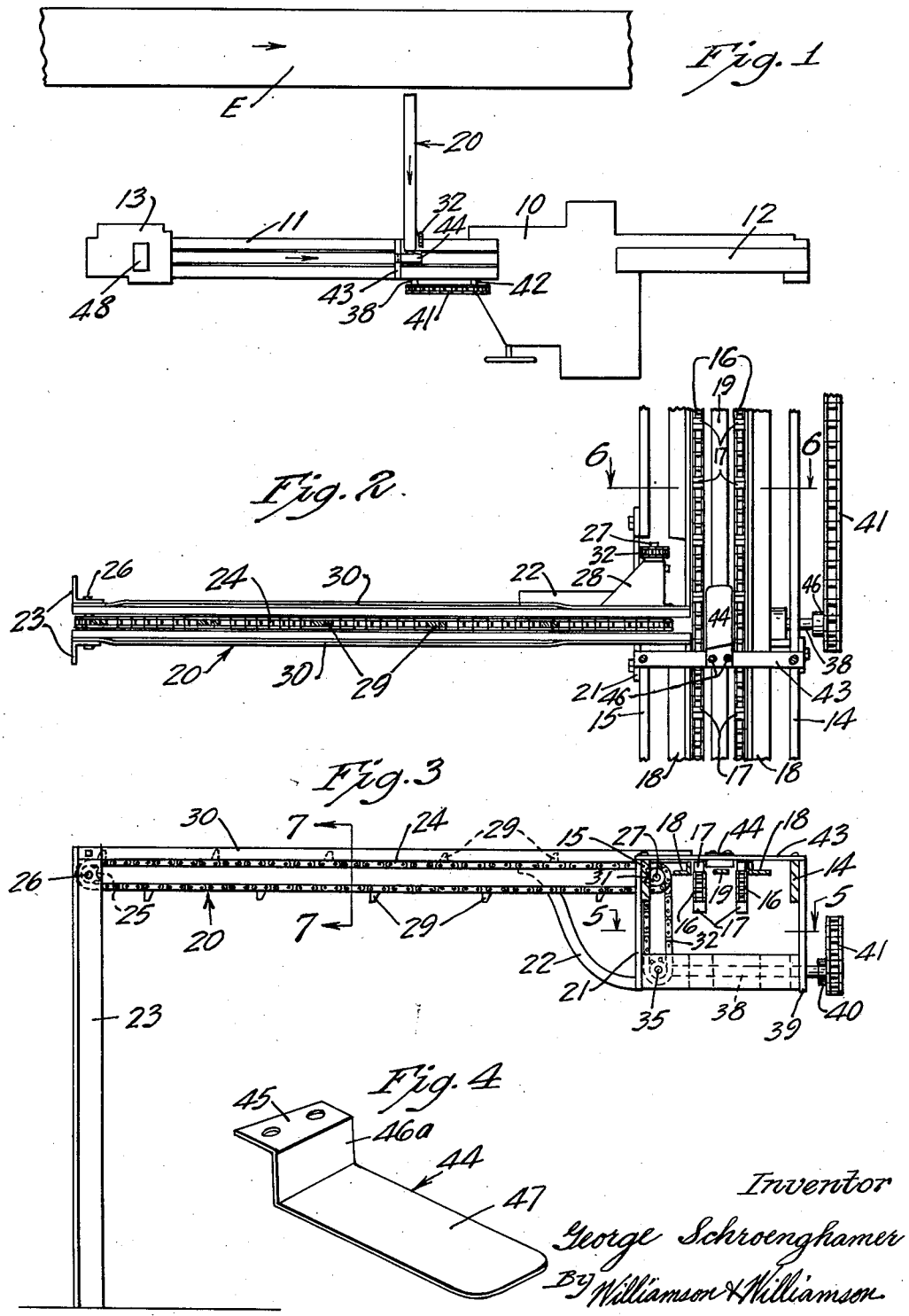

2,640,578

UNITED STATES PATENT OFFICE 2,640,578

ARTICLE TRANSFER FOR CONVEYER ORGANIZATION

George Schroenghamer, St. Paul, Minn., assignor, by mesne assignments, to Fenn Bros., Inc., Sioux Falls, S. Dak., a corporation of South Dakota Application April 7, 1949, Serial No. 86,092

2 Claims. (Cl. 198—20)

1

This invention relates to conveying apparatus and more particularly to a side intake for a candy packaging machine. A straight line packaging machine includes a conveyor which feeds pieces of candy into the wrapping section and a discharge conveyor at the other end. Such a machine is frequently placed in parallel spaced relation to an enrober belt which carries the candy from its final coating or other finishing operation.

An operator feeding the wrapping machine must either stand between the two conveyors, namely, the enrober belt and the packaging feed conveyor or the packaging machine must be positioned close to the enrober belt and the operator must then lean over the conveyor of the packaging machine in order to pick up pieces of candy from the enrober belt so that they can be deposited on the feed conveyor of the wrapping machine.

It is a general object of the present invention to provide a side intake for a candy packaging machine in the form of a conveyor which can be conveniently attached to the standard conveyor of the packaging machine so that an operator can pick up bars or pieces of candy from the enrober belt and deposit them on this side delivery conveyor which runs at a right angle to the enrober belt and from a point adjacent the edge of said belt to the feed conveyor of the packaging or wrapping machine. This eliminates the need for turning approximately 180° each time articles are picked up from the enrober belt and deposited on the wrapper feed conveyor as must now be done with the present apparatus.

Another object of the invention is to provide a side delivery feed conveyor which is constructed similarly to the conveyor of the wrapping machine and is arranged to be driven by the drive mechanism of the wrapping machine conveyor so that individual articles can be successively fed from the side delivery conveyor to the wrapping machine conveyor in the proper spaced relationship for feeding into the wrapping apparatus at timed intervals.

Another object of the invention is to provide a transfer table whereby the articles discharged from the side delivery conveyor will be located in exactly the proper position required for proper pickup by the conveyor of the wrapping or packaging machine.

The above and other objects and advantages of the invention will more fully appear from the following description made in connection with the accompanying drawings, wherein like reference characters refer to the same parts throughout the views, and in which:

Fig. 1 is a diagrammatical plan view of a wrap-

2 ping machine, an enrober belt and my side delivery intake conveyor extending between the two.

Fig. 2 is a plan view of the side delivery conveyor and a portion of the feed conveyor for the wrapping machine.

Fig. 3 is a side elevational view of the side intake conveyor with the wrapping machine feed conveyor in transverse vertical section.

Fig. 4 is an enlarged perspective view of the article transfer shelf.

Fig. 5 is an enlarged section taken approximately on the line 5—5 of Fig. 3.

Fig. 6 is an enlarged section taken approximately on the line 6—6 of Fig. 2 and

Fig. 7 is a section taken approximately on the line 7—7 of Fig. 3.

The wrapping machine shown in Fig. 1 includes a wrapping section 10, a feed conveyor 11 and a discharge conveyor 12. There is a magazine 13 at the left hand end of the conveyor 11 to hold small pieces of cardboard which are fed to the conveyor 11 and upon which the pieces of candy are placed prior to wrapping.

The wrapping machine just referred to is not shown in detail in its entirety, since parts thereof have nothing to do with the invention herein, applicant being concerned mainly with a side intake for a conveyor of a candy wrapping machine and not with the details of the wrapping mechanism itself. One example of such a wrapping machine is the model DF bar wrapper manufactured and sold by Package Machinery Company of Springfield, Massachusetts, and the diagrammatic layout of the machine 10, 11, 12, and 13 in Fig. 1 is taken from a circular of that company.

There are certain parts of this wrapping machine, and more specifically the feed conveyor thereof which will be referred to herein. The conveyor assembly includes a pair of side rails 14 and 15, between which are supported suitable conveyor chains 16, said chains having spaced upstanding lugs 17 thereon, the lugs of one chain being spaced approximately oppositely to those of the other chain. On the outer side of each chain 16 is a guide rail 18 and between said chains 16 is a smooth track member 19. The conveyor chains 16 are driven together by some suitable power machinism in the remainder of the packaging appartus. This is all a part of the conventional machine.

Extending laterally from the conveyor assembly 11 is my conveyor 20 which is utilized to transfer candy pieces from an enrober belt E shown in Fig. 1. Pieces are picked from the enrober belt by hand and placed on the transfer conveyor 20 which is arranged to deposit the pieces on the wrapping machine feed conveyor 11.

One end of the conveyor 20 is connected to a bracket 21 on the side rail 15 of the wrapper feed conveyor 11 by means of a brace or bracket 22. The other end of the conveyor 20 is supported by a pair of vertical angle irons 23.

An endless chain conveyor 24 extends around a sprocket 25 mounted on a shaft 26 which is supported between the angle irons 23. The other end of the chain 24 is carried by a shaft 27 which is supported by a bearing bracket 28 at the right-hand end of said conveyor 20. The chain 24 is provided with a plurality of upstanding longitudinally spaced lugs 29 which are similar to the lugs 17 on the dual conveyor chains 16, except that the spacing between the lugs 29 is greater than that between the lugs 17 for a purpose to become apparent below.

The conveyor chain 24 lies between a pair of guide members 30 which may take the form of angle irons providing a longitudinal trough having a central longitudinal opening to accommodate the conveyor chain. It should be noted that the rails 30 have their vertical portions relatively wider apart throughout most of the length of the conveyor 20 until they approach the right-hand or discharge end of the conveyor, whereupon they are spaced more closely. The wider spacings of the rails facilitate the placing of pieces of candy on the conveyor and the more closely spaced portions of the rails at the discharge end provide for desired positioning or alignment of the candy pieces prior to their transfer to the said conveyor 11 on the wrapping machine. The shaft 27 at the right-hand end of the chain conveyor 24 has a sprocket 31 thereon. The chain 24 rides upon this sprocket. The other end of the shaft 27 is connected by a vertical chain 32 extending between a sprocket 33 on shaft 27 and a lower sprocket 34 on a short stub shaft 35. This shaft carries a bevel gear 36 which meshes with a bevel gear 37 on a cross shaft 38, which is mounted between the bracket 21 and a bracket 39 at opposite sides of the feed conveyor 11. The shaft 38 has a sprocket 40 thereon which is connected by a chain 41 to a suitable moving part of the packaging machine 10, this being indicated by a power shaft 42 extending from the machine at the right-hand end of the packaging or wrapping feed conveyor 11.

Extending across the feed conveyor 11 adjacent the right-hand or discharge end of the transfer conveyor 20 is a cross piece 43, which supports a transfer shelf 44, the latter being shown enlarged in Fig. 4. This transfer shelf includes an upper rear portion 45 which is secured to the cross piece 43 by bolts 46. The shelf has a downwardly extending portion 46a which is approximately vertical, but which is shown in Fig. 2 to be located on a slight slant. The main portion of the shelf includes a flat smooth area 47 which lies between the wrapper feed conveyor, the chains 16 and their lugs 17, the lugs extending above the transfer table portion 47. The upper run of the endless conveyor chain 24, which is the transfer conveyor chain, is disposed at a height slightly greater than that of the upper run of the wrapper feed conveyor 11. The transfer table portion 47 is located slightly lower than the height of the upper run of conveyor 20 and slightly higher than the upper runs of the chains 16 which form the wrapper feed conveyor 11. When the machine is operated, base cards 48 are fed from the card feed 13 on the conventional wrapping machine, there being a card placed across the chains 16 and between pairs of longitudinally spaced lugs 17 on said chains. The cards are carried toward the wrapping machinery 10 in the spaced relation provided by the lugs 17. Pieces of candy are picked up by the operator from the enrober belt E and deposited on the conveyor 20, there being a single piece of candy lengthwise on the conveyor between each pair of transfer conveyor lugs 29. These pieces of candy are discharged from the conveyor 20 onto the transfer shelf portion 47, the ends of the candy piece or bar extending beyond the sides of the transfer shelf. As the wrapper feed conveyor lugs 17 move past the transfer shelf 44 a pair of lugs 17, one on each of the chains 16, engage the extending ends of the candy bar and will carry it from the shelf portion 47, causing the bar to be deposited on one of the cardboard bases 48, which is at the same time being transported between sets of lugs 17 and which passes under the shelf portion 47 as best shown in Fig. 6. The candy is then carried into the wrapper tin where it is automatically wrapped and discharged by the conveyor 12.

The movement of the conveyor 20 is synchronized with the movement of the conveyor 11 so that when a bar is discharged from the conveyor 20 it will land on the transfer shelf 44, when two pairs of lugs 17 on the chains 16 are approximately in the positions shown in Fig. 2 relative to the transfer shelf 44.

The transfer shelf prevents the bars or candy pieces from becoming cocked at an angle when they are transferred from conveyor 20 to conveyor 11, as would happen if deposit were made directly upon said conveyor 11. Since the transfer shelf 44 is stationary, bars discharged from the conveyor 20 will momentarily come to rest in a position aligned longitudinally with conveyor 20 and transversely of conveyor 11. This period of rest is almost instantaneous because the bar is immediately engaged by a pair of lugs on the chains 16, and the bar moves off sidewise in a straight line into the wrapper 10. The transfer or side delivery conveyor 20 is of considerable advantage in connection with a straight line wrapping machine such as mentioned herein where articles are picked up from a conveyor such as the enrober belt E which lies parallel the wrapper feed conveyor 11. The person who makes the manual transfer does not have to move through 180° to make the transfer if he is standing between the conveyors E and 11, but need only pick up the articles from conveyor E and deposit them between successive pairs of conveyor lugs 29. With my transfer or side intake conveyor, the operator need describe less than a quarter turn, in removing articles from the enrober belt E and placing them on the conveyor 20 between successive pairs of lugs 20. It not only enables the operator to feed the wrapping machine for a longer period of time without fatigue but enables him to more easily fill in each of the spaces between the conveyor lugs on the wrapper feed conveyor 11 without gaps. This is important because the wrapping machine 10 will cut off and place a wrapper in position for each longitudinally spaced set of feed conveyor lugs 17 whether or not there is a piece of candy properly deposited therebetween.

It will, of course, be understood that various changes may be made in the form, details, arrangement and proportions of the various parts without departing from the scope of my invention.

What I claim is:

1. A side delivery intake conveyor mechanism for use with a candy packaging machine including a feed conveyor of the type having a pair of spaced parallel endless conveyor elements with a plurality of upwardly extending spaced lugs disposed in opposed pairs thereon and adapted to engage candy bars successively delivered thereto, said side intake conveyor mechanism comprising an endless conveyor with its upper run disposed at a higher elevation than the adjacent portion of the feed conveyor elements, and a stationary horizontal article transfer shelf including means for mounting the same at the discharge end of said side intake endless conveyor and disposed at a lower elevation than said intake conveyor and at a higher elevation than the runs of said feed conveyor elements and having its lateral edges terminating between the parallel runs of said feed conveyor elements whereby the candy bars may be delivered to said shelf from said intake conveyor and the pickup lugs of said endless conveyor will engage successive articles delivered to said transfer shelf and deliver the same off from said shelf to the wrapping machine.

2. The structure set forth in claim 1 and the bottom surface of said article transfer shelf being disposed in slightly spaced relation above the runs of the feed conveyor elements to permit an article being carried by said elements to pass thereunder and receive a candy bar in overlying position thereon.

GEORGE SCHROENGHAMER.

References Cited in the file of this patent

UNITED STATES PATENTS

| Number | Name | Date |
|---|---|---|
| 602,375 | Suydam | Apr. 12, 1898 |
| 1,315,166 | Semashko | Sept. 2, 1919 |
| 1,513,007 | Remington | Oct. 28, 1924 |
| 1,669,220 | Thropp et al. | May 8, 1928 |
| 1,777,048 | Molins | Sept. 30, 1930 |
| 1,846,909 | Schmitt | Feb. 23, 1932 |
| 2,139,877 | Brandt | Dec. 13, 1938 |
| 2,141,226 | Rubel et al. | Dec. 27, 1938 |